United States Patent
Tatum

(10) Patent No.: US 11,567,852 B1
(45) Date of Patent: Jan. 31, 2023

(54) METHOD AND SYSTEM FOR ANALYTICS OF DATA FROM DISPARATE SOURCES

(71) Applicant: Leonard Joseph Tatum, Santa Clarita, CA (US)

(72) Inventor: Leonard Joseph Tatum, Santa Clarita, CA (US)

(*) Notice: Subject to any disclaimer, the term of this patent is extended or adjusted under 35 U.S.C. 154(b) by 0 days.

(21) Appl. No.: 17/062,430

(22) Filed: Oct. 2, 2020

(51) Int. Cl.
*G06F 11/34* (2006.01)
*G06F 11/36* (2006.01)
*G06F 11/32* (2006.01)
*G06F 11/30* (2006.01)

(52) U.S. Cl.
CPC ........ *G06F 11/3452* (2013.01); *G06F 11/302* (2013.01); *G06F 11/324* (2013.01); *G06F 11/3476* (2013.01); *G06F 11/3612* (2013.01)

(58) Field of Classification Search
CPC .............. G06F 11/3452; G06F 11/302; G06F 11/324; G06F 11/3612
See application file for complete search history.

(56) References Cited

U.S. PATENT DOCUMENTS

| | | | |
|---|---|---|---|
| 9,773,026 B1* | 9/2017 | Tetreault | G06F 11/30 |
| 11,106,442 B1* | 8/2021 | Hsiao | G06F 11/3419 |
| 2008/0301076 A1* | 12/2008 | Timmins | G06Q 10/06 706/46 |
| 2017/0083572 A1* | 3/2017 | Tankersley | G06F 16/24573 |
| 2019/0121685 A1* | 4/2019 | Coutinho | G06F 11/3476 |
| 2020/0379868 A1* | 12/2020 | Dherange | G06F 11/3438 |

* cited by examiner

*Primary Examiner* — Amine Riad
(74) *Attorney, Agent, or Firm* — Plager Schack LLP; Mark H. Plager; Alexis J. Saenz

(57) ABSTRACT

A system and process extract software application performance data from disparate ownership sources and make the various source data compatible for comparison data. A software application's performance in the marketplace may be compared to other applications in a same group with comparable data information. A M2M (mobile-to-mobile) technology is an interface layer connection to a backend server that builds machine learning pipelines and may use artificial intelligence to turn massive datasets into identifiable patterns, algorithms and statistical models. This layer is capable of cleaning, aggregating, and organizing data from disparate sources to produce meaningful conclusions to complex problems to inform strategic business decisions.

4 Claims, 3 Drawing Sheets

METHOD AND SYSTEM FOR ANALYTICS OF DATA FROM DISPARATE SOURCES

BACKGROUND

The embodiments herein relate generally to analytics and more particularly to a method and system for analytics of data from disparate sources.

An important goal of software development is to create an understanding and empathy with the end users. If you want to design a successful product, one should understand them. Designing for everyone results in an unfocused goal that will hurt a business' bottom line. This is why analytics have become so pivotal.

The challenges faced by today's data-driven organizations and the introduction of big data, is that risk managers, data scientists and other employees are overwhelmed with the amount of data that is collected. An organization may receive information on every incident and interaction that takes place on a daily basis, leaving analysts with thousands of interlocking datasets. With so much data available, it is difficult to dig down and access the insights that are needed most.

The next issue is trying to analyze data across multiple, disjointed sources. Different pieces of data are often housed in different systems. This leads to incomplete or inaccurate analysis. In addition to disjointed sources, there is also the limitation of having no context or cross reference for the data collected. For example, a software developer may have access to performance data of their own applications in the marketplace. However, the developer cannot access data related to other developers' products. Without this context, the software developer is unable to compare their own product data with competing products. For example, referring to FIG. 2, a process 20 is shown representative of current software development and analytics presentation. Two different apps are developed. When developers from the two different companies want to analyze the performance of their respective applications, the analytics service can only see information for products associated with each respective company and can only analyze products associated with each respective company. So, the developer from company A is unable to receive any analytics associated with products from company B.

Today, decision-makers and risk managers need access to all of their organization's data for insights on what is happening at any given moment. An organization's data lives in a centralized system that is blackboxed. Their data only belongs to them, which means other entities cannot see the data. They lack context and comparative analysis of data collected by outside organizations with similar types of product(s).

Another huge conflict is inaccurate data. Without good input, output will be unreliable. A key cause of inaccurate data is manual errors made during data entry. This can lead to significant negative consequences if the analysis is used to influence decisions. Another issue is asymmetrical data; when information in one system does not reflect the changes made in another system, leaving it outdated.

Objectively, analytics are used to adapt to the person(s) using the platform. The reason why this does not work well is because there is no context since data from one's own application product cannot be evaluated against a competing application.

Embodiments of the subject technology solve these problems.

SUMMARY

In one aspect of the subject technology, a computer program product for generating analytics data for a software developer is disclosed. The computer program product comprises a non-transitory computer readable storage medium having computer readable program code embodied therewith. The computer readable program code is configured to: pull performance data of a plurality of software applications in a marketplace; classify all the software applications by their respective content into groups; strip source information of each software application; assign each software application a unique identification, wherein the unique identification does not include the source information; receive a request from an end user to analyze performance of a selected software application; analyze the performance of the selected software application in comparison to other software applications in a same group as the selected software application; and generate analytics data of the selected software application performance relative to the other software applications in the same group as the selected software application for display to the end user in a client-side computing device interface.

In another aspect of the subject technology, a method for generating analytics data for a software developer is disclosed. The method comprises pulling performance data of a plurality of software applications in a marketplace; classifying all the software applications by their respective content into groups; stripping source information of each software application; assigning each software application a unique identification, wherein the unique identification does not include the source information; receiving a request from an end user to analyze performance of a selected software application; analyzing the performance of the selected software application in comparison to other software applications in a same group as the selected software application; and generating analytics data of the selected software application performance relative to the other software applications in the same group as the selected software application for display to the end user in a client-side computing device interface

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
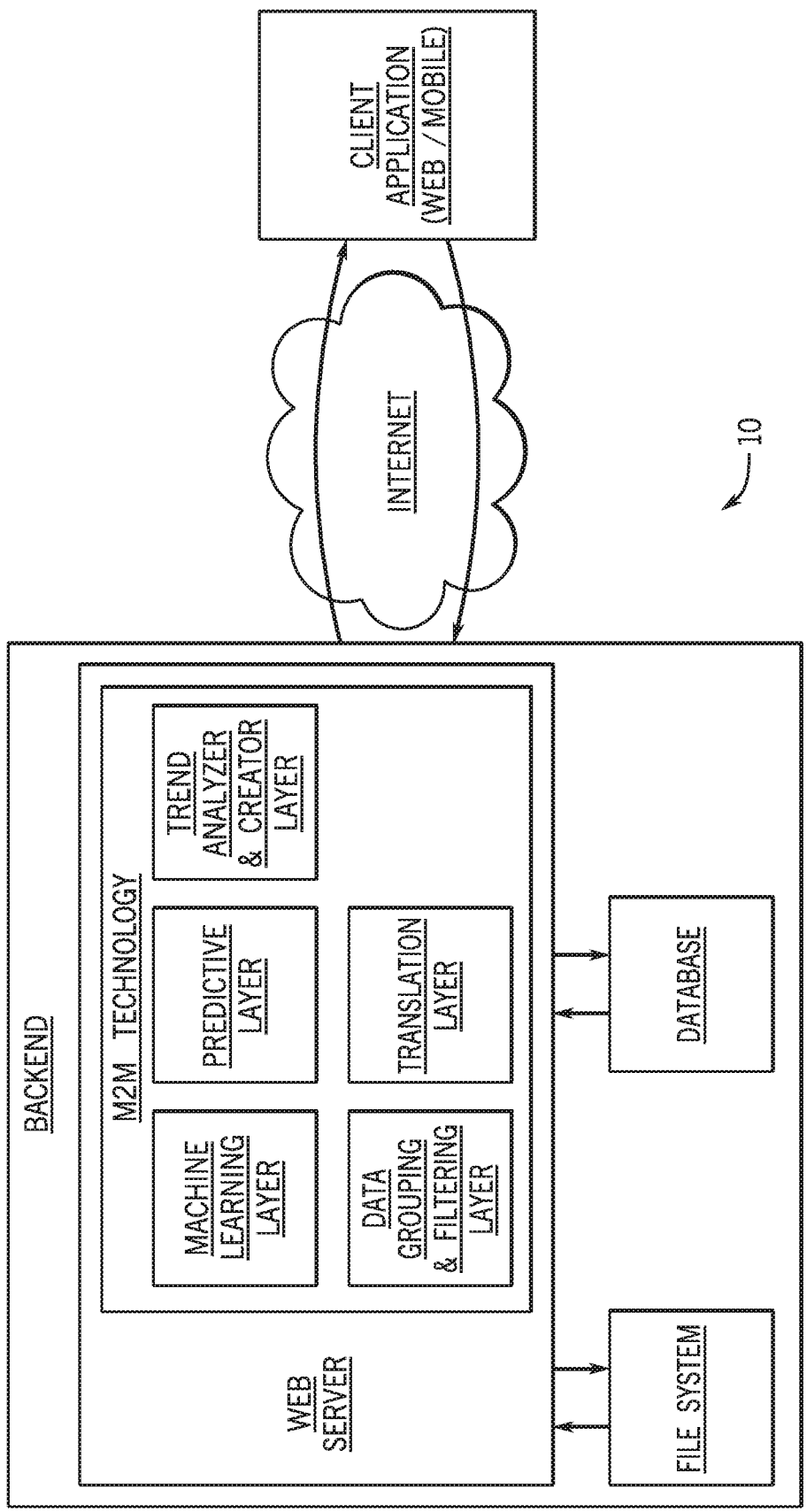
FIG. 1 is a block diagram of a system for analytical model building of a software application performance according to an embodiment of the subject technology.
Figure 2:
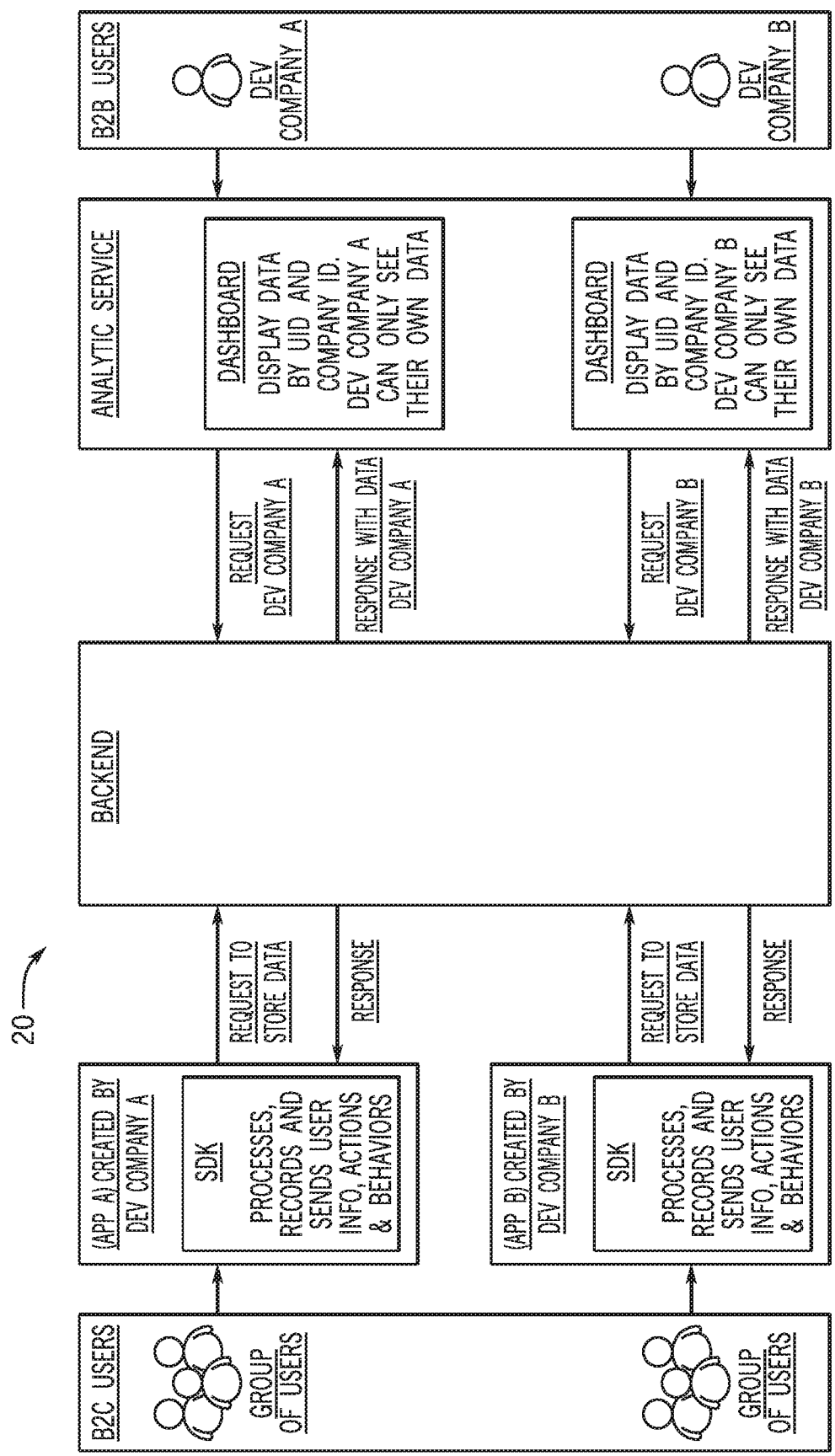
FIG. 2 is a flowchart of a process for generating analytics data for software developers according to the prior art.

Today, analytic interpretation and predictions are flawed and centered around inaccurate user predictions. Objectively, analytics are used to adapt to the person(s) using the platform. The reason why this does not work well is because there is no context. Entities can only do analysis on data they have gathered, using their own products, which tell them nothing about how users behave in other applications that are the same or similar to theirs. Without that context, the adaptive behavior is incorrect because human actions and behaviors differ even inside of similar products. For example, given two similar RPG games that are identical in content and gameplay, but developed by two different companies. User A may only spend money in Game A, even though both products are RPGs and essentially the same. The two development companies will then have two different interpretations of how monetarily valuable User A is. This is an example of the flaw. The subject technology addresses this divergent assessment of user value and behavior, because all data is pooled together regardless of product ownership. The subject technology evaluates the entire user behavior stack to provide more accurate data results.

Embodiments disclosed herein generally provide a system and process to generate analytics data for a software developer which provides comparison data for an application relative to other products in the marketplace. As described generally above, software application performance is generally done in a silo where metrics for the application are based only on data related to the application itself. A developer does not have access to the performance data of a competing application product. As will be appreciated, embodiments of the subject technology perform the unconventional step of aggregating data from normally disparate sources (for example, competing product data). The process may automate the analysis of data from different sources which may then be presented to an end user so that the user may have a direct comparison of similar or competing application products.

The subject technology described below generally relates to mobile application analytics. Some embodiments may be configured to collect data indicative of interests, behaviors and habits of a mobile user based on a way in which various mobile applications are used by the mobile user. Evaluations and analysis stem from the perspective of data pools to extend analysis from data collected by individual entities to data collected by all entities accessible by the system. The subject technology provides many advantages over conventional mobile application analytics, which only perform analysis rooted in ownership. By way of one non-limiting illustrative example, the subject technology can tell you how many users downloaded an application (same as current mobile application analytics), but also compares that number of user downloads to other mobile applications similar to that application by way of genre, content and other relevant features; this is the context that is unconventional within the industry. Analytics and data analysis, today, works from an ownership perspective, which means that each individual entity can only perform analysis on data they have personally collected; that they own. The subject technology may anonymize all collected data, allowing comparative analysis across all datasets in the system.

Referring now to FIG. 1, a system 10 for analytical model building of a software application performance is shown according to an exemplary embodiment. As will be appreciated, the system 10 is application data source agnostic. The system 10 may include a host server which is configured to provide automated analysis of data performance from various software applications and generate a comparative analysis of performance to a client application. In embodiments, data collection may be initiated through a data collection protocol that sends data to a central data repository. Various Key Performance Indicators (KPI) are triggered based on the user's interaction with the one or more applications. Once the data is captured by one or more applications and sent to a central data repository, it may be anonymized, ordered, grouped and prepared for analysis. The system 10 may present analytics results to an end user (for example, a software developer) through the client application. The client-side application may be web-based or mobile computing device based.

The host server may include one or more computing devices programmed with a software module(s) of the analytics engine(s) generating the comparative results. In some embodiments, the software module is configured for mobile-to-mobile (M2M) technology. In an exemplary embodiment, the software module may include the following sub-modules: a machine learning layer, a predictive layer, a trend analyzer and creator layer, a data grouping and filtering layer, and a translation layer.

Data Grouping & Filtering

The Data Grouping & Filtering layer module may aggregate functions on groups of data returned from a query. The filter element may be a modifier used on an aggregate function to limit the values used in an aggregation. In an exemplary embodiment, the system may create matrices using genre and specific tags extracted from the pulled performance data that describe the content of the product. Once the matrices are created, products and their tethered data may be grouped into buckets using these matrices. Each bucket may be analyzed knowing that the data being compared is relevant (for example, by genre and content).

Machine Learning

The Machine Learning layer may be a software module for data analysis that automates analytical model building. This branch of the system can learn from the pulled performance data, identify patterns and make decisions with minimal human intervention. Embodiments may include machine learning operating in two ways, "supervised machine learning" and "unsupervised machine learning".

Supervised machine learning embodiments may be configured to uncover and determine the following from the pulled performance data, (i) how users are behaving, (ii) when users are behaving, (iii) what circumstances cause certain behaviors.(for example, making a purchase, opening an app, installing an app, etc.), (iv) what time intervals do these behaviors occur, (v) what data points should be ignored and which data points are outliers, (vi) what are the user interests, (vii) can user interests be a condition for certain user behaviors? As the machine learning layer continues to learn, the more conclusions may be created about the user dataset.

Unsupervised machine learning embodiments may be configured to infer patterns from a dataset without reference to known or labeled outcomes. Some applications for this include (i) splitting the dataset into groups (aiding the Data Grouping & Filtering module), (ii) automatically discovering unusual data points in the dataset, (iii) reducing the number of features in a dataset (dimensionality reduction), and (iv) discovering unforeseen conclusions about user behaviors.

Predictive Layer

The Predictive Layer module may analyze patterns in data so that past behavior can be used to forecast likely future behavior. Data history may be analyzed and derived to conclusions. The raw data may be processed to make predictions about consumer behavior for future campaigns and actions. For example, using data history the system may identify that apps released in May generate the most revenue. The system may predict that any apps released in May will generate more revenue than any other release date.

Translation layer

In the process of converting human language into computing algorithms, the Translation layer may be used so that the source language can be translated into the target language according to these algorithms. For example, the Translation Layer may be configured to provide human readable results from conclusions drawn from the Machine Learning and Predictive layers.

Instead of saying "Total Users: 10", the Translation Layer may formulate sentences, for example, "The total number of users you have is 10." The Translation Layer, when combined with the other layers, provides comparative analysis and more details in easily understood terms. For example, the combination of layers may provide an output such as, "The total number of users you have is 10. Which is less than 100 other RPG games similar to yours released this month. One thing you can do to increase user downloads is x, y, z."

Trend Analyzer & Creator

In some embodiments, the Trend Analyzer & Creator module may operate in cooperation with the Translation layer. The Trend Analyzer & Creator may be configured to report what is going on with users at any given time. For example, in the aforementioned example output, the portion that states, "Which is less than 100 other RPG games similar to yours released this month" may be derived from the Trend Analyzer & Creator module.

Figure 3:
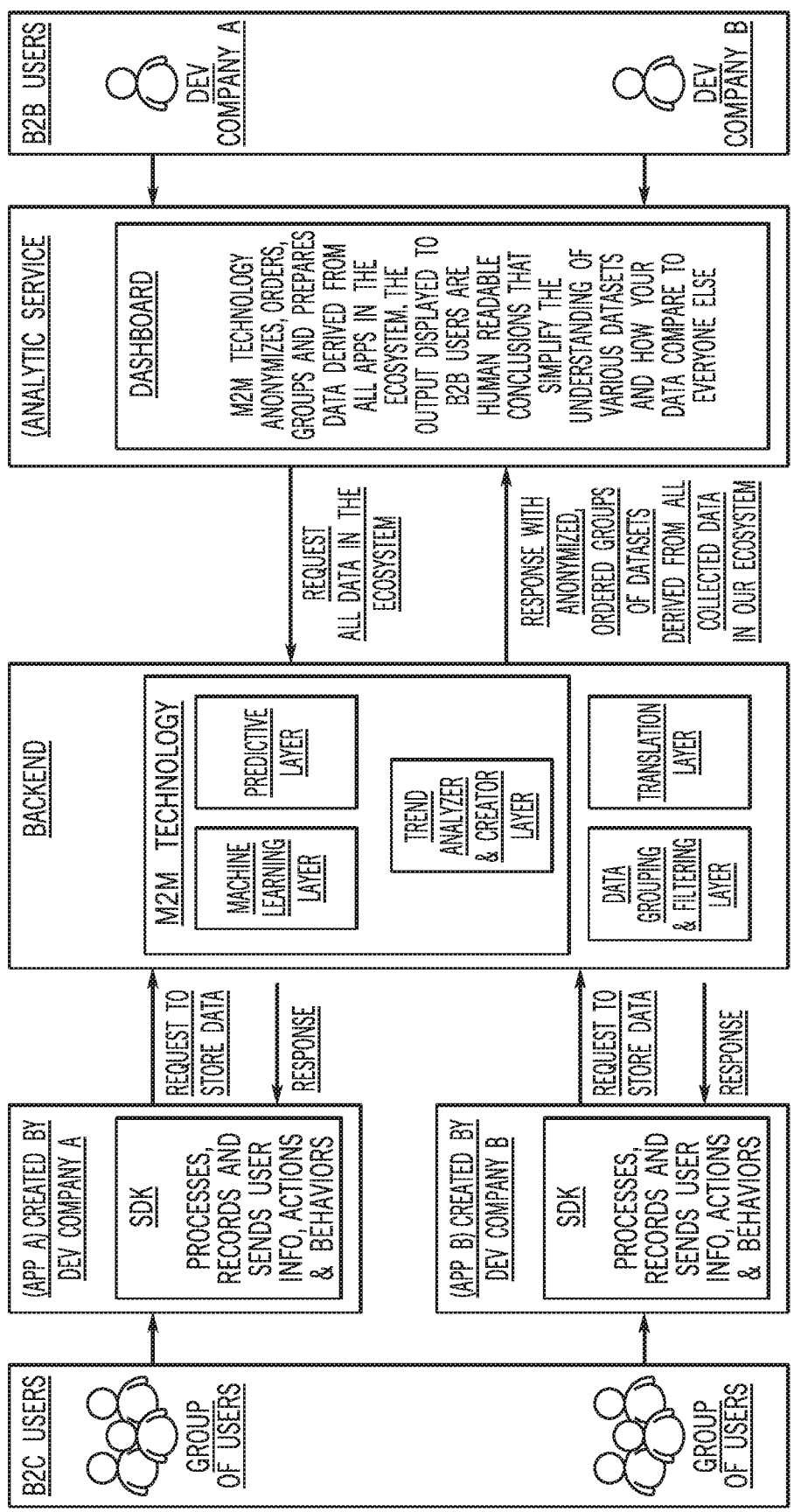
FIG. 3 is a flowchart for generating analytics data for a software developer according to an embodiment of the subject technology.

Referring now to FIG. 3, a process 30 for generating analytics data is shown according to an exemplary embodiment. In the process, two different software applications ("App A" and "App B") are developed by distinct companies. While only two apps are shown, it should be understood that Apps A and B may represent all different apps being processed by a system using the process 30. Business to consumer users (B2C) use any of the apps being processed. The group of consumers that use App A may or may not include one or more members of the group of users using App B. The backend host server may pull data about the usage of any or all apps upon a request from any software developer. The host server may access a software develop kit (SDK) to extract processes and records for either App (A or B or both or other apps). The host server may receive user information, user actions, and user behaviors related to the App from the SDK. The extracted app data may be processed using one or more of a machine learning layer, a predictive layer, a trend analyzer and creator layer, a data grouping and filtering layer, and a translation layer. The data filtering module may in an exemplary embodiment, classify all apps processed by the system by their content. Some embodiments may also classify apps by their genre. In an exemplary embodiment, the apps may be anonymized by stripping data of their source information away. The anonymized app data may be assigned a unique identification number. The anonymized app data may be organized into groups and analyzed for compared performance to other members of a same group. The machine learning module, predictive layer module, and/or the trend analyzer and creator layer module may generate real and predictive results of an app's performance relative to other apps in the same group or relative to apps in a similar group. In some embodiments, the generated output may be provided as human readable conclusions through the client-side application user interface.

For data and insights to be understood and impactful, it needs to be visually presented in graphs or charts. While these tools are incredibly useful, it may be appreciated that it is difficult to build them manually. Taking the time to pull information from multiple areas and put it into a reporting tool is frustrating and time-consuming. Additionally, analytics can be hard to scale as an organization and the amount of data it collects grows. Collecting information and creating reports becomes increasingly complex. A system that can grow with the organization is crucial to managing this issue.

The system produces actionable insights using data. It has the ability to take data, understand it, process it and extract value from it so that the system can visualize and communicate its findings. The visualization layer on the client-side application may use machine learning and artificial intelligence from the host server/back end to turn massive data streams produced by industrial operations and the subject technology into insights. The visualization aspect may be configured to generate reports, clean, organize and manage data. Some embodiments may include a dashboard displayed on the client-side application which explains what machine learning models are doing, conveys statistical inference and communicates results to clients.

One of the most valuable aspects of the system is its ability to connect with stakeholders to gain a full understanding of the problems they are looking to solve. By leveraging the subject technology, data is examined and evaluated to answer questions such as who is the client? What exactly does the client need to solve? How can the system translate an ambiguous request into a concrete, well-defined problem? Is this data already available? If so, what parts of the data are useful? If not, what more data is needed? What kind of resources—time, money, and infrastructure—would it take to collect this data in a usable form? What are the high-level characteristics and are any of them more significant than others? By performing this in-depth analysis, aspects of the subject technology are able to unearth high-value insights and predictions.

The subject technology is a system capable of applying objective analysis of facts before coming to a conclusion. It looks beyond what is on the surface to discover patterns and solutions within the data. All of the analysis and technical results that a data system can come up with is of little value unless it can be explained in a comprehensible and compelling way. The subject technology achieves this by taking advantage of versatile processes to comb through as much data as possible in search of interesting statistical relationships. These relationships derive from an environment that is agnostic of platform and product ownership constraints and limitations.

In embodiments, the conclusion(s) derived by the system and/or processes described above may be statements which may translate data results into human comprehended expressions. By way of one non-limiting illustrative example, the system may output a statement that "Apps that launch during December receive the most profits in their first 28 days." Formulating human readable conclusions using machine learning and artificial intelligence simplifies the understanding of various datasets. This differs from today's non-human readable conclusions that focus on raw data output.

In some embodiments, the output from the host server backend may be derived based on scoring the data processed. Scores may be based on feature scaling, normalization and other algorithms. Feature scaling may normalize the range of independent variables, otherwise known as data normalization. More specifically, and as examples, the subject technology may use percentiles for calculating some scores (for example, an Activity Score and/or a Spending Score). A percentile may measure the value below which a given percentage of observations in a group of observation falls. As will be appreciated, the scoring/types of scores may not be found in other approaches. It is the inventors' understanding that no other analytic system uses the concept of "scores" for key performance indicator (KPI) representation.

Objectively, as part of making data more readable and useful, the process may create various scores. The process may create these scores for a number of reasons.

First, the subject scores allow the system to both rank and group users on a scale of 1-10. This can be applied to infinitely many users because these are scalar algorithms.

Secondly, seeing a score as opposed to what all other analytic services display, which are the raw values of each KPI, not only tells a viewer the user information, but the score under embodiments of the subject technology tells the viewer the user information compared to all other users. With other systems today, this comparative analysis is unavailable (if not possible). Currently, all one receives are averages related to all users or each individual user raw data for app opens or session time, for example. This tells you nothing about how those numbers compare to other users. As may be appreciated, the comparative analysis provided in an easy to see scoring system is the power of the subject technology. The system and process provide output with a context about which users are actually the most active compared to all users using apps.

It's not just "how much time has a particular user spent in one's app" or "what is the average time users spend in an app". The subject technology answers for example, the question of "for this particular user compared to all users, how much time does he spend in the app and how active is he in the app (app opens)". This concept is similar for all our scores.

The following is a description of various scores calculated for use in determining the output to the end user.

Activity Score

Embodiments of the subject technology may include a process for calculating an Activity Score using a scaling algorithm. Feature scaling may normalize the range of independent variables. In data processing, it is also known as "data normalization". In an exemplary embodiment, percentiles may be used to generate the Activity Score. A "percentile" may provide a measure of the value below which a given percentage of observations in a group of observations falls.

In an embodiment, a weight may be added to users who have longer session times (play games longer). This is how the system may differentiate casual gamers from hardcore gamers and everything inbetween. In order to do this, the length of sessions that may be used for evaluations may be defined and weighted values may be added to them. Table 1 below shows an example weighting based on a playing session duration.

TABLE 1

| Weighted Value (Fibonnaci) | Session Time (Minutes) |
| --- | --- |
| 1 | 1 |
| 2 | 5 |
| 3 | 10 |
| 5 | 30 |
| 8 | 60 |
| 13 | 90 |

The following describes formulas in calculating the Activity Score according to exemplary embodiments.

(1.) Formula Part 1 of 2 :: [T=W*F]

F—frequency of session; the number of recorded sessions by a user.

W—weighted value; fibonacci sequence assigned value used to add weighted value to session length.

T—total normalized score; the summation of all the various types of activity (both frequency of sessions and session length). This will give the user a final normalized score that will be used in the next set of calculations.

The first part of the Activity Score calculations begins with calculating the normalized scores for each of the users. This value rewards longer session times and takes into consideration the frequency of sessions. This value is bolded in the tables below and is used in the second set of final calculations to retrieve the Activity Score.

In general, it should be noted that embodiments may follow similar processes for calculating any "scores" (for example, Spending, Activity, Reputation, Tendency, etc.) which may weight the attributes used for calculations and normalize the values. Then using this normalized value, the final score may be calculated. Tables 2-5 which follow show a comparison of Activity Scores calculated for different users based on their assigned weighted values, session lengths, and frequency of purchases.

TABLE 2

User A Activity History-casual gamer.
The most this user plays is 10 minutes per session.

| W (Weighted Value) [Fibonnaci] | Session Length (minutes) | F (frequency of sessions) | T (total transaction score) Calculations: [W*F] |
| --- | --- | --- | --- |
| 1 | 1 | 15 | 15 |
| 2 | 5 | 7 | 14 |
| 3 | 10 | 5 | 15 |
| 5 | 30 | 0 | 0 |
| 8 | 60 | 0 | 0 |
| 13 | 90 | 0 | 0 |
| | | | 44 |

Note:
Total sessions = 27. Normalized Value: 44.

TABLE 3

User B Activity History-equally distributed sessions.

| Weighted Value (Fibonnaci) | Session Length (minutes) | F (frequency of purchases) | T (total transaction score) Calculations: [W*F] |
| --- | --- | --- | --- |
| 1 | 1 | 5 | 5 |
| 2 | 5 | 5 | 10 |
| 3 | 10 | 5 | 15 |
| 5 | 30 | 5 | 25 |
| 8 | 60 | 5 | 40 |
| 13 | 90 | 5 | 65 |
| | | | 160 |

Note:
Total sessions = 30. Normalized Value: 160.

TABLE 4

User C Activity History-hardcore gamer.
He only plays a minimum of 60 minutes per session.

| Weighted Value (Fibonnaci) | Session Length (minutes) | F (frequency of purchases) | T (total transaction score) Calculations: [W*F] |
|---|---|---|---|
| 1 | 1 | 0 | 0 |
| 2 | 5 | 0 | 0 |
| 3 | 10 | 0 | 0 |
| 5 | 30 | 0 | 0 |
| 8 | 60 | 8 | 64 |
| 13 | 90 | 10 | 130 |
| | | | 194 |

Note:
Total session = 18. Normalized Value: 194.

TABLE 5

User D Activity History-this user plays hardcore when he/she can, otherwise casually for very short period of times (1 minute or less).

| Weighted Value (Fibonnaci) | Session Length (minutes) | F (frequency of purchases) | T (total transaction score) Calculations: [W*F] |
|---|---|---|---|
| 1 | 1 | 10 | 10 |
| 2 | 5 | 0 | 0 |
| 3 | 10 | 0 | 0 |
| 5 | 30 | 0 | 0 |
| 8 | 60 | 0 | 0 |
| 13 | 90 | 10 | 130 |
| | | | 140 |

Note:
Total sessions = 20. Normalized Value: 140.

Even though User B has about a dozen more sessions than User C, his normalized score is still lower because he does not put in as many long-lasting sessions as User C does. User A is a casual gamer and never plays for longer than 10 minutes at a time. It comes to reason that his score would be on the low end. User D is an interesting case that many gamers fall into. User D represents users who are actually hardcore gamers, however, don't have time to play during certain times of the year due to work or school. When this sort of user is free, they play for long lengths of time, but when they are not free it is for very short stints. Even still, his normalized score is pretty decent.

Now that we have these normalized scores that represent both session length and frequency, a percentiles algorithm may be used to categorize these scores on a scale of 1-10. This will represent the final Activity Score, which is ultimately the measurement of game interest any given user has.

(2.) Formula Part 2 of 2 :: n=[p/100 * N]

n—ordinal rank; represents the threshold value for each score 1-10. This may be referred to as the Spending Score.

p—percentile; (0<P<=100) percentile of a list of N ordered values (sorted from least to greatest) is the smallest value in the list such that no more than P-percent of the data is strictly less than the value and at least P-percent of the data is less than or equal to that value. Since we are using a scale of 1-10, P will represent these values.

N—largest normalized score; this value represents the absolute largest normalized score of the ordered data set. In the case of our example, User C has the highest normalized score of 194.

Using the example from before with four users {A, B, C, D}, the calculations look like table 6 below. The value 194 comes from User C who has the largest normalized value out of the entire dataset.

TABLE 6

| Activity Score Range | n (Ordinal Rank) = [p/100 * N] |
|---|---|
| 1 | 5/100 * 194 = 9.7 |
| 2 | 10/100 * 194 = 19.4 |
| 3 | 20/100 * 194 = 38.8 |
| 4 | 30/100 * 194 = 58.2 |
| 5 | 40/100 * 194 = 77.6 |
| 6 | 50/100 * 194 = 97 |
| 7 | 60/100 * 194 = 116.4 |
| 8 | 70/100 * 194 = 135.8 |
| 9 | 80/100 * 194 = 155.2 |
| 10 | 90/100 * 194 = 174.6 |

Now that the Ordinal Rank is calculated, the Activity Scores may be assigned to the users.

TABLE 7

| User | Activity Score |
|---|---|
| User A | 3 - normalized score is 44, which places him less than 58.2 which is the minimum Ordinal Rank required to be at least a 4. |
| User B | 9 - normalized score is 160, which places him less than 174.6 which is the minimum Ordinal Rank required to be at least a 10. |
| User C | 10 - normalized score is 194. His score receives the maximum Ordinal Rank. |
| User D | 8 - normalized score is 140, which places him less than 155.2 which is the minimum ordinal rank required to be at least a 9. |

Spending Score

Embodiments of the subject technology may include a process for calculating a Spending Score using a scaling algorithm. The process for determining a spending score may be similar to the process for determining an Activity Score. Thus for sake of disclosure, the description of the process will not be repeated however, an application of the process may be illustrated in the tables that follow, which may be understood by referring back to the process used for the Activity Score. It will be appreciated that by including a calculation of a spending score to the output provided to the end user, that the end user is provided information more valuable than current approaches. The Spending Score calculation may figure out who has the most activity with making purchases and spending which is useful in evaluating app performance. To calculate the Spending Score, the number of transactions for both purchases and spending may be considered. Users who make larger purchases may be given higher scores than users who have the same transaction activity, but are making smaller purchases. Thus, in some embodiments, weighted values may be assigned to transactions based on the cost of a transaction and a consumer's frequency of transaction. Table 8 below shows an example weighting based on a consumer's transactions and their associated cost. Formula (1.) may use the data set from Table 8 to determine a Spending Score for users' activity shown in Tables 9-12.

TABLE 8

| Weighted Value (Fibonnaci) | Cost (USD) | Coin Equivalent |
|---|---|---|
| 1 | $0.99 | 100 |
| 2 | $2.99 | 310 |
| 3 | $9.99 | 1045 |
| 5 | $19.99 | 2095 |
| 8 | $49.99 | 5245 |
| 13 | $99.99 | 10550 |

TABLE 9

User A Purchase History - fairly even purchase distribution.

| W (Weighted Value) [Fibonnaci] | Available Purchase Packages | F (frequency of purchases) | T (total transaction score) Calculations: [W*F] |
|---|---|---|---|
| 1 | $0.99 | 3 | 3 |
| 2 | $2.99 | 2 | 4 |
| 3 | $9.99 | 2 | 6 |
| 5 | $19.99 | 2 | 10 |
| 8 | $49.99 | 4 | 32 |
| 13 | $99.99 | 2 | 26 |
| | | | 81 |

Note:
Total transactions (purchases) made = 15 Normalized Value: 81

TABLE 10

User B Purchase History - very frequent cheap package purchases.

| Weighted Value (Fibonnaci) | Available Purchase Packages | F (frequency of purchases) | T (total transaction score) Calculations: [W*F] |
|---|---|---|---|
| 1 | $0.99 | 20 | 20 |
| 2 | $2.99 | 1 | 2 |
| 3 | $9.99 | 2 | 6 |
| 5 | $19.99 | 3 | 15 |
| 8 | $49.99 | 0 | 0 |
| 13 | $99.99 | 0 | 0 |
| | | | 43 |

Note:
Total transactions (purchases) made = 26 Normalized Value: 43

TABLE 11

User C Purchase History - very frequent expensive package purchases.

| Weighted Value (Fibonnaci) | Available Purchase Packages | F (frequency of purchases) | T (total transaction score) Calculations: [W*F] |
|---|---|---|---|
| 1 | $0.99 | 0 | 0 |
| 2 | $2.99 | 0 | 0 |
| 3 | $9.99 | 0 | 0 |
| 5 | $19.99 | 3 | 15 |
| 8 | $49.99 | 7 | 56 |
| 13 | $99.99 | 5 | 65 |
| | | | 136 |

Note:
Total transactions (purchases) made = 15 Normalized Value: 136

TABLE 12

User D Purchase History - very little activity

| Weighted Value (Fibonnaci) | Available Purchase Packages | F (frequency of purchases) | T (total transaction score) Calculations: [W*F] |
|---|---|---|---|
| 1 | $0.99 | 1 | 1 |
| 2 | $2.99 | 1 | 2 |
| 3 | $9.99 | 1 | 3 |
| 5 | $19.99 | 1 | 5 |
| 8 | $49.99 | 0 | 0 |
| 13 | $99.99 | 0 | 0 |
| | | | 11 |

Note:
Total transactions (purchases) made = 4. Normalized Value: 11

An end user will see that even though User B has the most transactions out of all users, his normalized score is still not the highest, because he is mostly buying the cheapest packages. Even though User A and User C both have the same number of transactions, User C has a much higher normalized score, because many of his purchases are of expensive packages. User D has the lowest normalized score for obvious reasons. He has not made too many transactions, and the few transactions he has made are less expensive.

The system may then use Formula (2.) (see above) to determine percentile to categorize these scores on a scale of 1-10. In the scenario shown, the largest normalized score "N" is 136 for User C. The results of Formula (2.) will represent the final Spending Score, which is ultimately the measurement of spending power any given user has. The results are shown in Table 13. Table 14 shows the Spending Scores in ordinal rank with finalized Spending Scores assigned.

TABLE 13

| Spending Score Range | n (Ordinal Rank) = [p/100 * N] |
|---|---|
| 1 | 5/100 * 136 = 6.8 |
| 2 | 10/100 * 136 = 13.6 |
| 3 | 20/100 * 136 = 27.2 |
| 4 | 30/100 * 136 = 40.8 |
| 5 | 40/100 * 136 = 54.4 |
| 6 | 50/100 * 136 = 68 |
| 7 | 60/100 * 136 = 81.6 |
| 8 | 70/100 * 136 = 95.2 |
| 9 | 80/100 * 136 = 108.8 |
| 10 | 90/100 * 136 = 122.4 |

TABLE 14

| User | Spending Score |
|---|---|
| User A | 6 - normalized score is 81, which places him less than 81.6 which is the minimum Ordinal Rank required to be at least a 7. |
| User B | 4 - normalized score is 43, which places him less than 54.4 which is the minimum Ordinal Rank required to be at least a 5. |
| User C | 10 - normalized score is 136. His score receives the maximum Ordinal Rank. |
| User D | 1 - normalized score is 11, which places him less than 13.6 which is the minimum ordinal rank required to be at least a 2. |

In another embodiment, the system may provide a feature for gaming/social apps which may be used to measure end user behavior when interacting with an app. The "end user"

referred to here may be different than the "end user" discussed above which may be a software developer evaluating the performance of an app in the marketplace. The "end user" referred to here may be for example, a game user, a social media user, or other end user of an app engaging with others on the app's platform. In an exemplary embodiment, the feature may be a Reputation Score. The objective of the Reputation Score is to address toxic behavior in peer-to-peer activities. Toxic and, in some cases, criminal interactions have been so difficult for the software industry and law enforcement to eliminate. Using the subject technology can help curb these behaviors and amass a portfolio of offenses. Today, offenders have no real punishment, because the extent of prevention occurs on a product by product basis. The result of this is that once punishment is issued, the offender moves on to the next product and does it all over again. The subject technology is to the Applicant's the only technology in the world that maintains a history of toxic behaviors no matter what product the offender uses. This allows developers to prevent offenders from joining their product all together based on their history.

An exemplary embodiment of a process for determining a Reputation Score may include a Default Reputation Score; (for example, every user starts with 100 as the total normalized score. This value will be used in the next set of calculations. This also means that by default, all users will start with a Reputation Score of 10) and a divisor, which may be used to escalate both positive and negative actions, and allow for trolls, or false reports to be negated (padding). The ceiling for normalized score is 100 in the embodiment described and the floor is 0. There are no negative scores. However, it will be understood that other implementations of the process may arbitrarily use different ceiling and floor values. These elements may make the process fair with both rewards and punishment. The Reputation Score may use a process that assigns values to user activity and includes weighting and normalization of the values.

(3.) Formula Part 1 of 2 :: [T=W*F]

F—Math.Round(frequency of reported behaviors/incident padding); round divided evaluation of the number of times any specific action/behavior is reported by other users or app admin, divided by a scalar value {1, 2, 3, 4} representing incident padding. Incident padding is a way to escalate both the consequences of positive and negative action/behavior. This will minimize minor offenses, to avoid large guilds from ruining a player's reputation. And will also minimize highest praises to encourage more exemplary positive behaviors.

W—weighted value; negative sets {-1, -2, -3, -5}, positive sets {1, 2, 3, 5}

T—total normalized score; the summation of all the various types of behavior scores. This will give the user a final normalized score that will be used in the next set of calculations.

The first part of the Reputation Score calculations begins with calculating the normalized scores for each of the users. This value heavily penalizes toxic behaviors, and rewards positive behaviors, and takes into consideration the frequency of recorded behavior incidences.

This value is bolded in tables 15-18 below and is used in the second set of final calculations to retrieve the Reputation Score.

TABLE 15

User A Reported Behavior History - hacker/racist/baddie.

| W (Weighted Value) [Fibonnaci] | Action/Behavior | F (frequency of purchases) *Divide by a scalar value {1, 2, 3, 4} representing incident padding. | T (total transaction score) Calculations: [W*F] |
|---|---|---|---|
| -1 | {Poor Sportsmanship} | Math.Round(3/4) = 1 | -1 |
| -2 | {Trolling, Constant Pinging} | Math.Round(15/3) = 5 | -10 |
| -3 | {AFK, Complaining} | Math.Round(15/2) = 8 | -24 |
| -5 | {Bad/Offensive Language, Cheating} | Math.Round(30/1) = 30 | -150 |
| 1 | {Good Sportsmanship} | Math.Round(0/1) = 0 | 0 |
| 2 | {Great Leadership} | Math.Round(2/2) = 1 | 2 |
| 3 | {Excellent Teammate} | Math.Round(7/3) = 2 | 6 |
| 5 | {MVP} | Math.Round(15/4) = 4 | 20 |
| | | | -157 |

Note:

Total reports made = 87 [63 NEGATIVE/24 POSITIVE] = 72.4% negative reports Normalized Value: -157

TABLE 16

User B Reported Behavior History - poor sportsmanship. Complains, talks about others and only thinks of himself in team settings.

| W (Weighted Value) [Fibonnaci] | Action/Behavior | F (frequency of purchases) *Divide by a scalar value {1, 2, 3, 4} representing incident padding. | T (total transaction score) Calculations: [W*F] |
|---|---|---|---|
| -1 | {Poor Sportsmanship} | Math.Round(10/4) = 3 | -3 |
| -2 | {Trolling, Constant Pinging} | Math.Round(15/3) = 5 | -10 |
| -3 | {AFK, Complaining} | Math.Round(20/2) = 10 | -30 |
| -5 | {Bad/Offensive Language, Cheating} | Math.Round(7/1) = 7 | -35 |
| 1 | {Good Sportsmanship} | Math.Round(10/1) = 10 | 10 |
| 2 | {Great Leadership} | Math.Round(7/2) = 4 | 8 |
| 3 | {Excellent Teammate} | Math.Round(12/3) = 4 | 12 |
| 5 | {MVP} | Math.Round(7/4) = 2 | 10 |
| | | | -38 |

Note:
Total reports made = 88 [52 NEGATIVE/36 POSITIVE] = 59.0% negative reports Normalized Value: -38

TABLE 17

User C Reported Behavior History - standard user.

| W (Weighted Value) [Fibonnaci] | Action/Behavior | F (frequency of purchases) *Divide by a scalar value {1, 2, 3, 4} representing incident padding. | T (total transaction score) Calculations: [W*F] |
|---|---|---|---|
| −1 | {Poor Sportsmanship} | Math.Round(8/4) = 2 | −2 |
| −2 | {Trolling, Constant Pinging} | Math.Round(5/3) = 2 | −4 |
| −3 | {AFK, Complaining} | Math.Round(2/2) = 1 | −3 |
| −5 | {Bad/Offensive Language, Cheating} | Math.Round(1/1) = 1 | −5 |
| 1 | {Good Sportsmanship} | Math.Round(20/1) = 20 | 20 |
| 2 | {Great Leadership} | Math.Round(20/2) = 10 | 20 |
| 3 | {Excellent Teammate} | Math.Round(15/3) = 5 | 15 |
| 5 | {MVP} | Math.Round(15/4) = 4 | 20 |
|  |  |  | 61 |

Note:
Total reports made = 86 [16 NEGATIVE/70 POSITIVE] = 18.6% negative reports
Normalized Value: 61

TABLE 18

User D Reported Behavior History - professional user.
Is very kind to everyone.

| W (Weighted Value) [Fibonnaci] | Action/Behavior | F (frequency of purchases) *Divide by a scalar value {1, 2, 3, 4} representing incident padding. | T (total transaction score) Calculations: [W*F] |
|---|---|---|---|
| −1 | {Poor Sportsmanship} | Math.Round(1/4) = 0 | 0 |
| −2 | {Trolling, Constant Pinging} | Math.Round(1/3) = 0 | 0 |
| −3 | {AFK, Complaining} | Math.Round(3/2) = 2 | −6 |
| −5 | {Bad/Offensive Language, Cheating} | Math.Round(0/1) = 0 | 0 |
| 1 | {Good Sportsmanship) | Math.Round(10/1) = 10 | 10 |
| 2 | {Great Leadership} | Math.Round(15/2) = 8 | 16 |
| 3 | {Excellent Teammate} | Math.Round(20/3) = 7 | 21 |
| 5 | {MVP} | Math. Round(30/4) = 8 | 40 |
|  |  |  | 81 |

Note:
Total reports made = 80 [5 NEGATIVE/75 POSITIVE] = 6.3% negative reports Normalized Value: 81

As will be appreciated when reviewing the results above, the penalties have a significant impact. Of all the scores—Activity Score, Spending Score, Tendency Score—the Reputation score has the largest distribution gap. It is important to understand that reported negative offenses impact your score tremendously. But at the same time, there is a path to recovery through continual positive reports.

The Reputation Score provides objective evidence which may be used by developers/admin to reprimand users who have negative scores. Actions such as banning and/or flagging on a dashboard so that developers have options for how to deal with them may be implemented. Users with poor Reputation Scores may be displayed to other member software developers/companies so that these other entities may consider prohibiting users with poor Reputation Scores from downloading and/or using their app.

Normalized scores may be used to determine percentiles to categorize these scores on a scale of 1-10. This will represent the final Reputation Score, which is ultimately the measurement of reputation any given user has. In some embodiments, any negative values may automatically receive a score of 1, since the normalized scores are all positive values.

(4.) Formula Part 2 of 2 :: n=[p/100 * N]

n—ordinal rank; represents the threshold value for each score 1-10. This is what we refer to as the Reputation Score.

p—percentile; (0<P<=100) percentile of a list of N ordered values (sorted from least to greatest) is the smallest value in the list such that no more than P-percent of the data is strictly less than the value and at least P-percent of the data is less than or equal to that value. Since we are using a scale of 1-10, P will represent these values.

N—largest normalized score; this value represents the absolute largest normalized score of the ordered data set. In the case of our example, User D has the highest normalized score of 81.

In calculating values using formula (4.), the scenario below will use the highest normalized value from Tables 15-18.

TABLE 19

| Reputation Score Range | n (Ordinal Rank) = [p/100 * N] |
|---|---|
| 1 | 5/100 * 81 = 4.1 |
| 2 | 10/100 * 81 = 8.1 |
| 3 | 20/100 * 81 = 16.2 |
| 4 | 30/100 * 81 = 24.3 |
| 5 | 40/100 * 81 = 32.4 |
| 6 | 50/100 * 81 = 40.5 |
| 7 | 60/100 * 81 = 48.6 |
| 8 | 70/100 * 81 = 56.7 |
| 9 | 80/100 * 81 = 64.8 |
| 10 | 90/100 * 81 = 72.9 |

Now that the Ordinal Rank is calculated, Reputation Scores can be assigned to the users.

TABLE 20

| User | Reputation Score |
|---|---|
| User A | 1 - normalized score is −157, which places him less than 4.1 which is the minimum Ordinal Rank required to be at least a 1. |
| User B | 1 - normalized score is −38, which places him less than 4.1 which is the minimum Ordinal Rank required to be at least a 1. |
| User C | 8 - normalized score is 61, which places him less than 64.8 which is the minimum Ordinal Rank required to be at least a 9. |
| User D | 10 - transaction score is 81, His score receives the maximum Ordinal Rank. |

As can be seen, User A may be a consumer that software companies may want to avoid having in their ecosystem. User A received the lowest normalized score which receives the minimum Reputation score. User B also received the lowest Reputation Score because their behavior, while not as bad as User A, still reflects a generally toxic behavior to other users in the app's environment. Developers and companies may readily identify the poor behavior and the potential for future poor behavior by seeing such easily scaled rank scoring.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media may be utilized. In the context of this disclosure, a computer readable storage medium may be any tangible or non-transitory medium that can contain, or store a program (for example, the program product) for use by or in connection with an instruction execution system, apparatus, or device.

The computer readable media may be performed by a computing device. For example, the host server and the client-side device may be computing devices performing any of the features or processes described above. A computing device may be for example, a computer server, smart mobile telephone devices, personal computer systems, tablet devices, server computer systems, handheld or laptop devices, multiprocessor systems, microprocessor-based systems, set top boxes, programmable consumer electronics, network PCs, and distributed cloud computing environments that include any of the above systems or devices, and the like. The computing device may be described in the general context of computer system executable instructions, such as program modules, being executed by a computer system. In some embodiments, the computing device may be a cloud computing node connected to a cloud computing network. The computing device may be practiced in distributed cloud computing environments where tasks are performed by remote processing devices that are linked through a communications network. In a distributed cloud computing environment, program modules may be located in both local and remote computer system storage media including memory storage devices.

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 16 of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A computer program product for generating analytics data for a software developer, the computer program product comprising a non-transitory computer readable storage medium having computer readable program code embodied therewith, the computer readable program code being configured to, when executed by a computer processor:

pull performance data of a plurality of different software applications from different sources in a marketplace;

generate tags extracted from the pulled performance data of the plurality of different software applications;

pool together the plurality of different software applications from different sources;

classify all the software applications by their respective content into groups based on the tags;

strip source information from each software application;

assign each software application a unique identification, wherein the unique identification does not include the source information;

receive a request to analyze performance of a selected software application;

score different types of user activity for an end user in one or more of the plurality of different software applications;

via a machine learning module, analyze the performance of the selected software application in comparison to other software applications in a same group as the selected software application;

via the machine learning module, generate analytics data of the selected software application performance relative to the other software applications in the same group as the selected software application;

via a predictive layer module, generate predictions of future consumer behavior for the selected software application in the marketplace based on the generated analytics data;

translate, from a source computing language, the generated analytics data and the generated predictions, into a human readable target language with formulated sentences describing the generated analytics and generated predictions; and display in a client-side computing device interface, the human readable target language with formulated sentences.

2. The computer program product of claim 1, further comprising computer readable program code configured to:

weight attributes from the pulled performance data;

normalize the weighted attributes;

determine a scale ranking score for the normalized weighted attributes; and display the pulled performance data by the scale ranking score.

3. A method for generating analytics data for a software developer, comprising:

pulling performance data of a plurality of different software applications from different sources in a marketplace;

generating tags extracted from the pulled performance data of the plurality of different software applications;

pooling together the plurality of different software applications from different sources;

classifying all the software applications by their respective content into groups based on the tags;

stripping source information from each software application;

assigning each software application a unique identification, wherein the unique identification does not include the source information;

receiving a request to analyze performance of a selected software application;

scoring different types of user activity for an end user in one or more of the plurality of different software applications;

via a machine learning module, analyzing the performance of the selected software application in comparison to other software applications in a same group as the selected software application;

via the machine learning module, generating analytics data of the selected software application performance relative to the other software applications in the same group as the selected software application;

via a predictive layer module, generating predictions of future consumer behavior for the selected software application in the marketplace based on the generated analytics data;

translating, from a source computing language, the generated analytics data and the generated predictions, into a human readable target language with formulated sentences describing the generated analytics and generated predictions; and displaying in a client-side computing device interface, the human readable target language with formulated sentences.

4. The method of claim 3, further comprising:

weighting attributes from the pulled performance data;

normalizing the weighted attributes;

determining a scale ranking score for the normalized weighted attributes; and displaying the pulled performance data by the scale ranking score.

* * * * *